United States Patent [19]

Box, Jr. et al.

[11] 4,062,772

[45] * Dec. 13, 1977

[54] POLLUTED WATER PURIFICATION

[75] Inventors: E. O. Box, Jr.; Floyd Farha, Jr., both of Bartlesville, Okla.

[73] Assignee: Phillips Petroleum Company, Bartlesville, Okla.

[*] Notice: The portion of the term of this patent subsequent to Dec. 14, 1993, has been disclaimed.

[21] Appl. No.: 672,830

[22] Filed: Apr. 1, 1976

[51] Int. Cl.$^2$ .................... B01J 23/16; C02B 1/34
[52] U.S. Cl. .................... 210/63 R; 252/471; 252/476
[58] Field of Search .................... 210/18, 50, 59, 63; 252/471, 476, 462, 475; 423/599

[56] References Cited

U.S. PATENT DOCUMENTS

| | | | |
|---|---|---|---|
| 2,690,425 | 9/1954 | Moses et al. | 210/63 |
| 3,186,982 | 6/1965 | Benger | 210/63 |
| 3,271,447 | 9/1966 | Naylor | 252/471 |
| 3,338,952 | 8/1967 | Callahan et al. | 252/471 |
| 3,442,802 | 5/1969 | Hamilton et al. | 210/63 |
| 3,823,088 | 7/1974 | Box et al. | 210/63 |
| 3,872,027 | 3/1975 | Christmann et al. | 252/471 |
| 3,893,949 | 7/1975 | Sakai et al. | 252/471 |
| 3,992,295 | 11/1976 | Box et al. | 210/63 R |
| 3,997,440 | 12/1976 | Box et al. | 252/471 |

*Primary Examiner*—Wilbur L. Bascomb, Jr.
*Assistant Examiner*—Peter A. Hruskoci

[57] ABSTRACT

Organically polluted waters are purified by contacting with a solid copper-manganese-oxygen catalyst promoted with bismuth under oxidizing conditions. In one preferred embodiment, an aqueous stream obtained from the effluent of an oxidative dehydrogenation process containing contaminating oxygen-containing oganic materials is subjected to oxidizing conditions in the presence of a copper-manganese-bismuth-oxygen catalyst to convert the water to an aqueous product.

10 Claims, No Drawings

POLLUTED WATER PURIFICATION

This invention relates to the purification of organically polluted waters. In accordance with another aspect, this invention relates to a process for converting organic contaminated aqueous streams to fresh water by oxidation in the presence of a bismuth-promoted solid copper-manganese-oxygen catalyst. In accordance with another aspect, this invention relates to a continuous process for the abatement of water pollution by removing oxidizable organic wastes from aqueous streams by oxidizing these compounds, preferably in the liquid phase, in the presence of a solid copper manganite catalyst promoted with bismuth. In accordance with a further aspect, this invention relates to an improved copper manganite catalyst promoted with bismuth which catalyst has utility in oxidation reactions.

The problem of disposing of waste-containing waters has, in recent years, become more acute due to increasing population and increasing industrial activity. This is particularly true of waters which are polluted by the presence of organic materials such as waters discharged in a chemical process. Frequently, such waste waters contain organic materials in concentrations far too low for them to be conveniently or economically recoverable, yet in concentrations so high that it is impractical and undesirable to simply pump the waste water into available steams, rivers, lakes or ponds.

Some processes are known in which such organic-containing waste waters can be subjected to air oxidation under elevated temperatures. Such air oxidation converts most or all of the organic matter into harmless materials such as carbon dioxide or water vapor. This reaction is sometimes carried out in the presence of catalysts to promote the oxidation and to allow the reaction to be carried out under less severe conditions.

Although a number of catalysts and catalytic processes are known to carry out such air oxidation, not all catalysts which have activity for promoting oxidation have been found to be suitable. The conditions under which small amounts of organic wastes are oxidized in the presence of large amounts of water are relatively severe. The present invention provides an alternative catalyst and process to achieve this purpose. The outstanding feature of the invention is the activity and durability of the catalyst system.

Accordingly, an object of this invention is to provide an improved process for the purification of organically polluted water.

Another object of this invention is to provide a process for the purification of water streams containing oxygen-containing compounds.

A further object of this invention is to provide an improved oxidation catalyst.

Other objects and aspects, as well as the several advantages of the invention, will be apparent to those skilled in the art upon reading the specification and the appended claims.

In accordance with the invention, a process is provided for converting water contaminated with organic materials to an aqueous product by contacting contaminated aqueous streams under oxidation conditions with a bismuth-promoted solid copper-manganese-oxygen catalyst (copper manganite).

More specifically, in accordance with the invention, a process is provided for continuously converting organic contaminated aqueous streams to fresh water by contacting such an aqueous stream in the liquid or vapor phase with a solid copper manganite catalyst promoted with bismuth under conditions to produce water essentially free of pollutants.

Further, in accordance with the invention, an improved catalyst useful for oxidation reactions is provided by promoting solid copper manganite with bismuth.

The pollutants, for example, are dissolved and suspended olefins, paraffins, aromatics, naphthenes, and oxygenated organic compounds including acids, alcohols, aldehydes, ethers, ketones, and the like contained in waste water produced from various chemical and biological sources.

The solid copper manganite catalyst compositions utilized in this invention consist of copper, manganese, and oxygen in which the atomic ratio of copper to manganese can vary from about 0.25:1 to about 4:1. Particularly useful compositions have empirical formulas such as $Cu_3Mn_2O_6$, $Cu_2Mn_2O_5$, $CuMnO_2$, $CuMn_2O_3$, $CuMn_3O_4$, and $CuMn_2O_4$, and mixtures thereof. These catalysts are prepared by employing conventional techniques including intimate mixing of the oxides or hydroxides by ball milling, grinding, and the like, and by coprecipitation of the oxalates or hydroxides from a solution containing dissolved salts of the metals. The precipitate is washed to remove soluble contaminants such as, for example, potassium nitrate, sodium chloride, sodium sulfate, and the like. The purified material is then dried and calcined in air for about 30 minutes to 20 hours or longer at temperatures ranging from bout 500° to 1600° F (260°–871° C), more preferably from about 900°–1100° F (482°–593° C).

The catalysts contemplated in the practice of this invention comprise solid compositions of copper, manganese, and oxygen (copper manganite) promoted with a bismuth compound.

Metal compounds that can be used in preparing the catalysts include the acetates, chlorides, hydroxides, oxides, nitrates, sulfates, and the like, and mixtures thereof. Exemplary compounds, for example, include copper acetate, copper nitrate, copper oxides, copper sulfate, manganese chloride, manganese nitrate, manganese oxides, manganese sulfate, bismuth chloride, bismuth hydroxide, bismuth nitrate, bismuth oxalate, bismuth oxides, and the like, and mixtures thereof.

The atom ratios of the metal components making up the catalysts generally fall within the following ranges: Cu/Mn from about 0.25:1 to about 4:1 and Bi/Mn from about 0.0003:1 to about 0.5:1, more preferably from about 0.005:1 to about 0.2:1.

The catalyst compositions can be prepared by dry mixing, precipitation, coprecipitation, and impregnation techniques, and combinations thereof conventionally used in the art for producing composites which are then subsequently calcined in air to obtain the final product. A particularly preferred technique used in this invention is the impregnation of a copper-manganese-oxygen composite (copper manganite) with a minor amount of a solution of a bismuth compound. By a minor amount is meant the addition of from about 0.1 to about 20 weight percent, more preferably from about 1 to about 10 weight percent, bismuth, calculated as the metal, based on the weight of the dry bismuth compound plus the dry copper-manganese-oxygen compound (copper manganite). After impregnation, the composite is dried and calcined in air for about 30 minutes to 20 hours or longer at temperatures ranging from 500° F to 1600° F (260°–871° C), more preferably from about 800°–1100°

F (426°–593° C), to obtain the final product, which, after cooling, is normally crushed and screened to obtain particles of the desired size. In addition, the crushed material can be mixed with a lubricant such as polyethylene and formed into pellets and the like, if desired. The resulting pellets are normally calcined to remove the lubricant before using the catalyst in the water purification process. The calcined pellets can also be crushed and screened to obtain a specific mesh size range, for example, 10 to 20 mesh particles, if desired.

As previously indicated, metal salts of copper, manganese, and bismuth that can be used in forming the catalysts include the acetates, chlorides, formates, nitrates, sulfates, and the like. When dry mixing is employed to formulate the compositions, the oxides, carbonates, hydroxides, oxalates, and the like can be used, providing that upon calcination in air the final product has the desired previously cited composition. The calcined product is a catalyst of spinel structure having an ordered crystal structure encompassing all components and has an apparent bulk density of about 0.8 to about 1.7 g per cc and a surface area ranging from about 8–50 square meters per gram.

Aqueous wastes which are applicable as feeds for the process of the present invention are those which contain minor amounts of dissolved and/or suspended organic materials. The process is particularly applicable for feeds in which the organic materials are hydrocarbons and/or oxygenated hydrocarbons such as are obtained in the aqueous streams recovered from the effluent from an oxidative dehydrogenation process. The organic materials can be present in the predominantly aqueous stream in a broad range of concentrations, but will ordinarily be present in amounts less than about 10 weight percent. It is generally more convenient to characterize the aqueous feeds by the total carbon content. Consequently, such feeds can contain from about 10 to about 100,000 ppm carbon, more frequently 25 to about 10,000 ppm carbon, and still more frequently 100–5,000 ppm carbon.

Such aqueous waste streams can be derived from any source such as chemical or biological sources. For best results, the aqueous waste streams will contain relatively little non-volatile and/or nonoxidizable inorganic materials.

The process can be carried out under a wide range of oxidation conditions depending upon the feedstock, catalyst, desired degree of removal of organic pollutant, and whether a liquid phase or vapor phase operation is used. Any suitable apparatus is used in a continuous or batch operation. Continuous operation through a fixed catalyst bed is presently preferred such as downflow operation through a vertically positioned fixed catalyst bed although other reactions modes can also be used.

In liquid phase operation, the temperature within the reaction zone generally will range from about 300°–575° F (149°–302° C), with a temperature in the range of about 400°–525° F (204°–274° C) being preferred, and under sufficient pressure to maintain a liquid phase in the reaction zone. Pressures up to 1100 psig (7584 kPa gage) or higher (i.e., 2000 psig or 13,790 kPa gage) can be employed for this purpose. The molar ratio of water to air in the reaction zone will be in the range of 5:1 to 200:1, preferably 8:1 to 50:1. The water feed will generally pass through the reaction zone at a rate of 0.1–10, preferably 2–5, LHSV.

In vapor phase operation, the temperature in the reaction zone will range from about 300°–1200° F (149°–649° C) at any convenient pressure. Generally, pressures ranging from about atmospheric to 100 psig (100–689 kPa gage) will be used. The molar ratio of water to air will be 10:1 to 200:1, preferably 80:1 to 150:1. The water rate will be in the range of 0.1–50, preferably 20–40, LHSV.

It can be seen from the above that in vapor phase operation which utilizes higher temperatures, much higher space rates can be utilized. Nevertheless, because vapor phase operation requires the vaporization of relatively large quantities of water, it is presently preferred to operate under liquid phase conditions.

The catalysts of this invention are active and relatively long-lived. When they become less active with the passage of time, they can be regenerated at process temperatures by shutting off the waste water feed and passing air through the catalyst bed.

SPECIFIC EXAMPLES

Catalyst Preparation

Copper manganite, corresponding to the formula $CuMn_2O_4$, commercially obtained, comprising 27 weight percent copper, 41 weight percent manganese, less than 4 weight percent of a mixture comprising iron, magnesium, silicon, calcium, chromium, aluminum, and nickel as tolerable impurities, and the balance combined oxygen was crushed and screened to obtain 8–16 mesh particles. The particles were calcined for five hours at 1100° F (593° C). The surface area of the product, catalyst number 1 (control) was 26.2 square meters per gram, and the apparent bulk density was 0.98 g/cc.

Portions of the control catalyst were individually impregnated with solutions of bismuth nitrate acidified with a little nitric acid sufficient to add on a dry basis the desired amount of bismuth calculated as the metal to each portion, i.e., 5 weight percent for catalyst 2 and 10 weight percent for catalyst 3. Each composite was then dried in an air oven at 120° F (49° C) and calcined in air in a muffle furnace for 3 hours at 1000° F (538° C).

Catalyst number 4 was prepared by dissolving appropriate quantities of copper nitrate and manganese nitrate, totaling 1.5 moles salt, in distilled water to obtain about 1200 ml solution. While stirring, sufficient aqueous 12 weight percent potassium hydroxide solution was added to reach a final pH of 10.5. The slurry was filtered to recover the solid precipitate and the precipitate was reslurried in 1.5 liters distilled water and refiltered. The precipitate was washed with 1 liter of distilled water, dried in an air oven at 120° F (49° C), and calcined in air in a muffle furnace for three hours at 1000° F (538° C). The resulting product was crushed and sieved to obtain an 8–16 mesh portion. The portion was impregnated with a solution of bismuth nitrate acidified with a little nitric acid sufficient to add on a dry basis 5 weight percent bismuth calculated as the metal. The composite as then dried in an air oven at 120° F and calcined in a muffle furnace as before for three hours at 1000°0 F. The surface area of the product was 23.6 square meters per gram, and the apparent bulk density was 1.15 g per cc.

The calculated atom ratios of the metal components in each catalyst are as follows:

Catalyst No. 1: $Cu_{0.5}Mn_1$ (Control) p1
Catalyst No. 2: $Cu_{0.5}Mn_1Bi_{0.03}$
Catalyst No. 3: $Cu_{0.5}Mn_1Bi_{0.07}$
Catalyst No. 4: $Cu_2Mn_1Bi_{0.05}$

EXAMPLE I

Each catalyst (25 ml) was charged into a fixed, vertically positioned tubular reactor. A mixture of air and waste water was continuously passed downwardly through the reactor, an automated test unit.

After a period of time on stream, the reactor effluent was sampled and analyzed for residual organic content in terms of ppm carbon and total oxygen demand (TOD).

The waste water feed was a synthetic mixture consisting of distilled water and sufficient methyl ethyl ketone to furnish the equivalent of 2000 ppm carbon (about 4600 ppm TOD). The feed water rate averaged 4 LHSV, the operating pressure was 1000 psig (6895 kPa), the temperature of the middle of the catalyst bed was maintained at 420° F (216° C), and the flow rate of air over the catalyst averaged 480 GHSV. The mole ratio of feed water to air averaged 10.4:1. The results obtained are presented in Table I

TABLE I

Liquid Phase Catalytic Air Oxidation of Aqueous Wastes over Cu-Mn-Bi-Containing Solid Catalysts

| Run No. | Cat. No. | Catalyst Description | Hours on Stream | Organic Carbon in Effluent, ppm | % Organic Carbon Removal | Effluent TOD, ppm | % Reduction TOD |
|---|---|---|---|---|---|---|---|
| 1a | 1 | $Cu_{0.5}Mn_1$ (Control) | 68 | 176 | 91.2 | 436 | 90.5 |
| 1b | | | 137 | 297 | 85.2 | 720 | 84.3 |
| 2a | 2 | $Cu_{0.5}Mn_1Bi_{0.03}$ | 44 | 23 | 98.9 | 43 | 99.1 |
| 2b | | | 113 | 58 | 97.1 | 158 | 96.6 |
| 3a | 3 | $Cu_{0.5}Mn_1Bi_{0.07}$ | 68 | 89 | 95.6 | 210 | 95.4 |
| 3b | | | 137 | 177 | 91.2 | 435 | 90.5 |
| 4a | 4 | $Cu_2Mn_1Bi_{0.05}$ | 70 | 15 | 99.3 | 20 | 99.6 |
| 4b | | | 126 | 15 | 99.3 | 18 | 99.6 |

The data show the invention catalysts in Runs 2–4 to be superior in performance and stability to the control catalyst in all instances under the conditions employed. Invention catalyst 4, with a Cu/Mn ratio of 2 and a Bi/Mn ratio of 0.05, in particular, is outstanding in effectiveness and durability.

EXAMPLE II

Another series of tests was conducted with butene O-X-D reboiler blowdown water containing dissolved organic compounds equivalent to 2500 ppm total oxygen demand. Catalyst charged was 25 ml. The feed water rate was 4.96 LHSV, the operating pressure averaged 650 psig (4481 kPa), the temperature of the middle of the catalyst bed averaged 426° F (219° C), and the mole ratio of feed water to air averaged 32:1, the equivalent of a flow rate of air over the catalyst of 192 GHSV. The results obtained with the catalysts of Example I that were used are shown in Table II.

TABLE II

Liquid Phase Catalytic Air Oxidation of Butene O-X-D Blowdown Water over Solid Cu-Mn-Bi Catalysts

| Run No. | Cat. No. | Catalyst Description | Hours on Stream | Organic Carbon in Effluent, ppm | % Organic Carbon Removal | Effluent TOD, ppm | % Reduction TOD |
|---|---|---|---|---|---|---|---|
| 1a | 1 | $Cu_{0.5}Mn_1$ (Control) | 26 | 52 | 97.4 | 130 | 97.2 |
| 1b | | | 50 | 50 | 97.5 | 121 | 97.4 |
| 2a | 2 | $Cu_{0.5}Mn_1Bi_{0.03}$ | 24 | 30 | 98.5 | 72 | 98.4 |
| 2b | | | 52 | 36 | 98.2 | 77 | 98.3 |

The results show the invention catalyst to be somewhat superior in performance to the control catalyst at the conditions employed. The amount of organic material contained in a sample of waste water produced in a commercial process was reduced to a very low level in this test.

We claim:

1. A process for the purification of aqueous streams containing organic material impurities dissovled and suspended therein to aqueous products substantially free of organic material which comprises contacting an aqueous stream containing oxidizable organic pollutant impuritites and an oxygen-containing gas with a solid copper manganite spinel structure catalyst promoted with bismuth in which the atomic ratio of copper to manganese varies from about 0.25:1 to about 4:1 and bismuth to manganese varies from about 0.0003:1 to about 0.5:1 under oxidation conditions including a temperature and a ratio of water to oxygen sufficient to convert said organic materials to innocuous materials, thereby converting said aqueous stream to a potable aqueous product which can be safely discarded or re-used.

2. A process according to claim 1 wherein said contacting is effected under liquid phase conditions at a temperature in the range of about 300°0 F to about 575°0 F, a liquid hourly space velocity (LHSV) of 0.1 to 10, and a molar ratio of water to oxygen in the range of 5:1 to 200:1.

3. A process according to claim 1 wherein said contacting is effected under vapor phase conditions at a temperature in the range of about 300° F to about 1200° F, a feed water rate of about 0.1 to 50 liquid hourly space velocity (LHSV), and a molar ratio of water to oxygen in the range of 10:1 to 200:1.

4. A process according to claim 1 wherein said aqueous stream contains hydrocarbons and oxygen-containing hydrocarbon compounds and is obtained from the effluent from an oxidative dehydrogenation process.

5. A process according to claim 1 wherein said oxygen-containing gas is air.

6. A process according to claim 1 wherein said contacting is effected under liquid phase conditions at a temperature in the range of about 400°–525°0 F (204°–274° C), and wherein the liquid hourly space velocity is in the range of 2 to 5.

7. A process according to claim 1 in which the catalyst is copper manganite of the formula $CuMn_2O_4$ promoted with bismuth in which the atomic ratio of bismuth to manganese varies from about 0.005:1 to about 0.2:1.

8. A catalyst composition consisting essentially of a solid copper manganite spinel structure promoted with bismuth in which the atomic ratio of copper to manganese varies from about 0.25:1 to about 4:1 and the bismuth to manganese atomic ratio varies from about 0.0003:1 to about 0.5:1.

9. A catalyst according to claim 8 wherein the atomic ratio of bismuth to manganese ranges from about 0.005:1 to about 0.2:1.

10. A composition according to claim 8 in which the catalyst is copper manganite of the formula $CuMn_2O_4$ promoted with bismuth in which the atomic ratio of bismuth to manganese varies from about 0.005:1 to about 0.2:1.

* * * * *